US011938957B2

(12) United States Patent
Wolff

(10) Patent No.: US 11,938,957 B2
(45) Date of Patent: Mar. 26, 2024

(54) DRIVING SCENARIO SAMPLING FOR TRAINING/TUNING MACHINE LEARNING MODELS FOR VEHICLES

(71) Applicant: Motional AD LLC, Boston, MA (US)

(72) Inventor: Eric Wolff, Boston, MA (US)

(73) Assignee: Motional AD LLC, Boston, MA (US)

( * ) Notice: Subject to any disclaimer, the term of this patent is extended or adjusted under 35 U.S.C. 154(b) by 358 days.

(21) Appl. No.: 17/001,616

(22) Filed: Aug. 24, 2020

(65) Prior Publication Data

US 2022/0055640 A1    Feb. 24, 2022

(51) Int. Cl.
*B60W 50/08* (2020.01)
*B60W 50/00* (2006.01)
*G06N 20/00* (2019.01)

(52) U.S. Cl.
CPC ........... *B60W 50/085* (2013.01); *G06N 20/00* (2019.01); *B60W 2050/0018* (2013.01); *B60W 2050/0082* (2013.01)

(58) Field of Classification Search
CPC ....... B60W 50/085; B60W 2050/0018; B60W 2050/0082; G06N 20/00
See application file for complete search history.

(56) References Cited

U.S. PATENT DOCUMENTS

| 11,270,165 | B2* | 3/2022 | Atsmon | G06N 3/006 |
| 11,364,927 | B2 | 6/2022 | Wolff | |
| 2006/0274659 | A1* | 12/2006 | Ouderkirk | H04L 41/145 370/241 |
| 2016/0019807 | A1 | 1/2016 | Uchida et al. | |
| 2019/0205667 | A1 | 7/2019 | Avidan et al. | |
| 2019/0228571 | A1* | 7/2019 | Atsmon | G01C 21/3815 |

(Continued)

FOREIGN PATENT DOCUMENTS

DE    102006044086    4/2008
EP    3620880    3/2020

(Continued)

OTHER PUBLICATIONS

Normal distribution, Dec. 29, 2019, Wikipedia, para. 1-5, http:/web.archive.org/web/20200101222940/https://en.wikipedia.org/wiki/Normal_distribution (Year: 2019).*

(Continued)

*Primary Examiner* — Ig T An
*Assistant Examiner* — Christine Nguyen Huynh
(74) *Attorney, Agent, or Firm* — Fish & Richardson P.C.

(57) ABSTRACT

Enclosed are embodiments for sampling driving scenarios for training machine learning models. In an embodiment, a method comprises: assigning, using at least one processor, a set of initial physical states to a set of objects in a map for a set of simulated driving scenarios, wherein the set of initial physical states are assigned according to one or more outputs of a random number generator; generating, using the at least one processor, the set of simulated driving scenarios in the map using the initial physical states of the objects in the set of objects; selecting, using the at least one processor, samples of the simulated driving scenarios; training, using the at least one processor, a machine learning model using the selected samples; and operating, using a control circuit, a vehicle in an environment using the trained machine learning model.

19 Claims, 6 Drawing Sheets

(56) References Cited

U.S. PATENT DOCUMENTS

| | | | |
|---|---|---|---|
| 2019/0318267 A1* | 10/2019 | Zhang | G06N 20/00 |
| 2020/0033869 A1* | 1/2020 | Palanisamy | B60W 40/10 |
| 2020/0074230 A1 | 3/2020 | Englard et al. | |
| 2020/0209858 A1 | 7/2020 | Trofymov et al. | |
| 2020/0225676 A1 | 7/2020 | Telpaz et al. | |
| 2020/0353943 A1* | 11/2020 | Siddiqui | G06N 3/045 |
| 2020/0406894 A1* | 12/2020 | Akella | B60W 10/18 |
| 2021/0056432 A1 | 2/2021 | Bannenberg et al. | |
| 2021/0347383 A1* | 11/2021 | Siebert | G08G 1/166 |

FOREIGN PATENT DOCUMENTS

| | | |
|---|---|---|
| JP | 2016-534325 | 11/2016 |
| JP | 2019-185783 | 10/2019 |
| JP | 2019-194071 | 11/2019 |
| JP | 2020-123259 | 8/2020 |
| WO | WO 2021/240528 | 12/2021 |

OTHER PUBLICATIONS

[No Author Listed], "SAE International: Surface Vehicle Recommended Practice, Taxonomy and Definitions for Terms Related to Driving Automation Systems for On-Road Motor Vehicles," SAE International, Sep. 30, 2016, 30 pages.

* cited by examiner

DRIVING SCENARIO SAMPLING FOR TRAINING/TUNING MACHINE LEARNING MODELS FOR VEHICLES

FIELD OF THE INVENTION

The description that follows relates generally to generating training and/or tuning data for machine learning models.

BACKGROUND

Autonomous vehicles (AVs) typically include machine learning models which need to be trained and tuned using training data. The accuracy of a machine learning model is highly dependent on the quality of the training and/or tuning data. For example, if the machine learning model will be used to predict the behavior of an AV in an operating environment with many static and dynamic objects, such as other vehicles. To ensure the accuracy of the machine learning model, it is important that the training and/or tuning data include a large dataset of diverse driving scenarios that qualitatively capture the normal behavior of the objects.

SUMMARY

Techniques are provided for sampling driving scenarios to provide training and/or tuning data for machine learning models.

In an embodiment, a method comprises: assigning, using at least one processor, a set of initial physical states to a set of objects (e.g., virtual vehicles, pedestrians, bicyclists) in a map for a set of simulated driving scenarios (e.g., traversing an intersection, lane changes), wherein the set of initial physical states are assigned according to one or more outputs of a random number generator; generating, using the at least one processor, the set of simulated driving scenarios in the map using the initial physical states of the objects; selecting, using the at least one processor, samples of the simulated driving scenarios; training, using the at least one processor, a machine learning model (e.g., a deep neural network) using the selected samples; and operating, using a control circuit, a vehicle in an environment using the trained machine learning model.

In an embodiment, at least one object in the set of objects is a virtual vehicle, and the method further comprises assigning a mental state of a virtual driver of the virtual vehicle (e.g., tends to accelerate fast from a stopped position, tends to tailgate), and simulating the driving scenario using the map, the initial physical states of each object in the set of the objects and the mental state of the virtual driver of the virtual vehicle.

In an embodiment, the mental state of the virtual driver includes an acceleration preference of the driver (e.g., preference to accelerate quickly from stopped position).

In an embodiment, the mental state of the virtual driver includes a preference to maintain a gap between the other virtual vehicle and other objects (e.g., a preference to tailgate).

In an embodiment, the mental state of the virtual driver includes a preference for a particular route.

In an embodiment, the mental state of the virtual driver includes a goal of the driver (e.g., to get to a destination quickly).

In an embodiment, the mental state of the virtual driver includes a politeness factor (e.g., a weighting factor) that determines how much the driver is willing to inconvenience other virtual drivers in the driving scenario.

In an embodiment, the further comprises: determining one or more failed driving scenarios (e.g., collision between two or more objectss) in the set of driving scenarios; and excluding the one or more failed driving scenarios from training the machine learning model (e.g., not included in the training data).

In an embodiment, a failed driving scenario includes a driving scenario where a collision is predicted between two or more objects.

In an embodiment, a failed driving scenario includes a driving scenario where acceleration or deacceleration values of the one or more objects are higher or lower than one or more specified threshold values (e.g., acceleration would cause the vehicle to lose control).

In an embodiment, the initial physical states of the objects in the set of objects include initial positions and initial accelerations, and the initial positions and the initial accelerations are assigned according to different random numbers output by the random number generator.

In an embodiment, generating the simulated driving scenarios further comprises predicting each driving scenario forward in time for a specified period of time before selecting the sample (e.g., to allow the various objects to traverse their respective trajectories without failure).

In an embodiment, the driving scenarios include traffic lights or traffic signs that are complied with by the one or more objects.

In an embodiment, the machine learning model is a deep learning neural network for motion prediction.

In an embodiment, the one or more objects includes at least one pedestrian.

In an embodiment, each sampled driving scenario includes a plurality of time stamps and associated position, velocity and label for each object.

In an embodiment, the method further comprises: embedding the sampled scenario into a pseudo-image (e.g., a BEV image); and training the machine learning model (e.g., train an image semantic neural network) using the pseudo-image.

In an embodiment, the method further comprises: selecting a unique seed from a statistical distribution (e.g., a normal distribution) and initializing the random number generator with the seed.

In an embodiment, the statistical distribution is a joint distribution over the driving scenario.

In an embodiment, the driving scenario is generated based on at least one of a specified density of objects (e.g., an urban city versus countryside), a specified day or a specified time of day (e.g., simulate rush hour traffic).

One or more of the disclosed embodiments provide one or more of the following advantages. The disclosed system and method allows a user to select, randomly initialize, simulate and sample physical and mental states of objects for multiple different driving scenarios through a user interface. The sampled driving scenarios can be used as training and/or tuning data for machine learning models either alone or to augment actual driving log data. The simulated driving scenarios can provide more comprehensive training and/or tuning data then could realistically be collected by vehicles in the real-world. Additional improvements to the training and/or tuning data include the ability to assign mental states to objects to better model real-world driving scenarios, where driver preferences can substantially impact the driving scenario.

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

Figure 1:
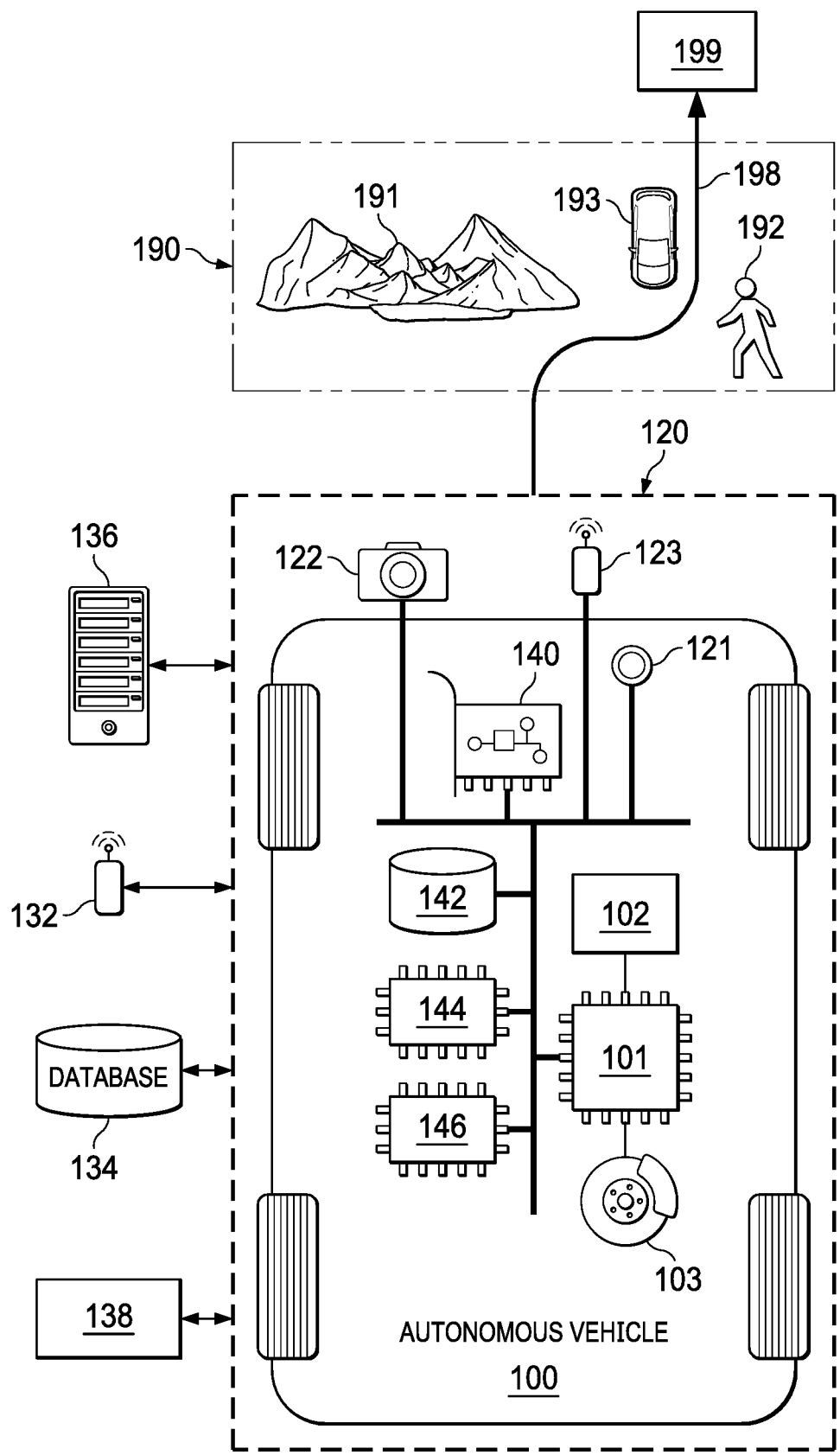
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Sampling Driving Scenarios General Overview Techniques are provided for sampling driving scenarios for use in training and/or tuning machine learning models. In an embodiment, a scenario initializer randomly selects one or more parameters to initialize that are related to a physical and/or mental state of one or more objects in a simulated driving scenario. The scenario initializer initializes a driving scenario simulator with the randomly selected one or more parameter. The driving scenario simulator generates an object track for each of the one or more objects in the driving scenario. A scenario sampling module samples the one or more object tracks, and stores the samples in a database. The samples are then used to train and/or tune one or more machine learning models.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, motorcycles, bicycles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are a Global Navigation Satellite System (GNSS) receiver, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media 138(e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
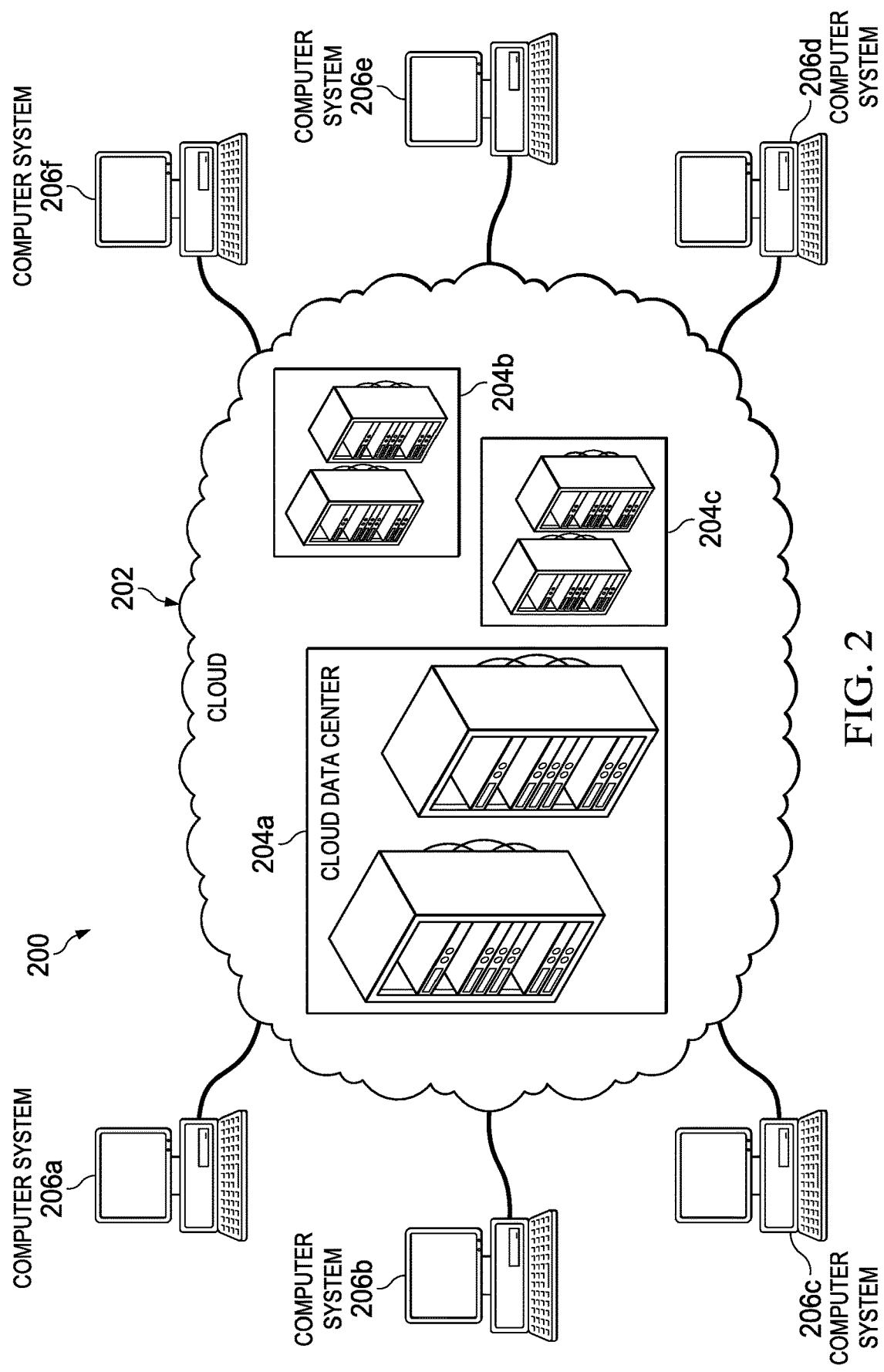
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
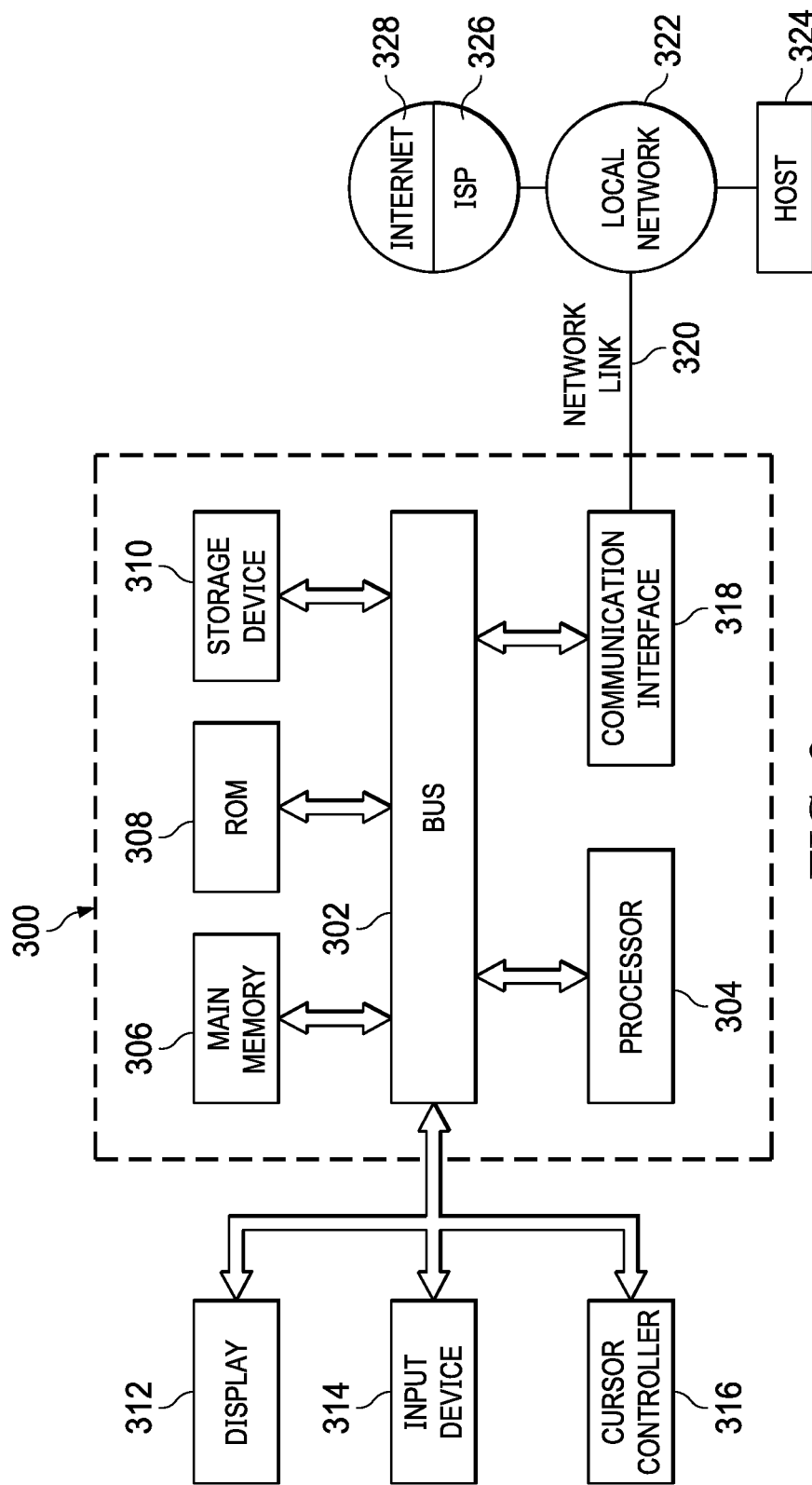
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
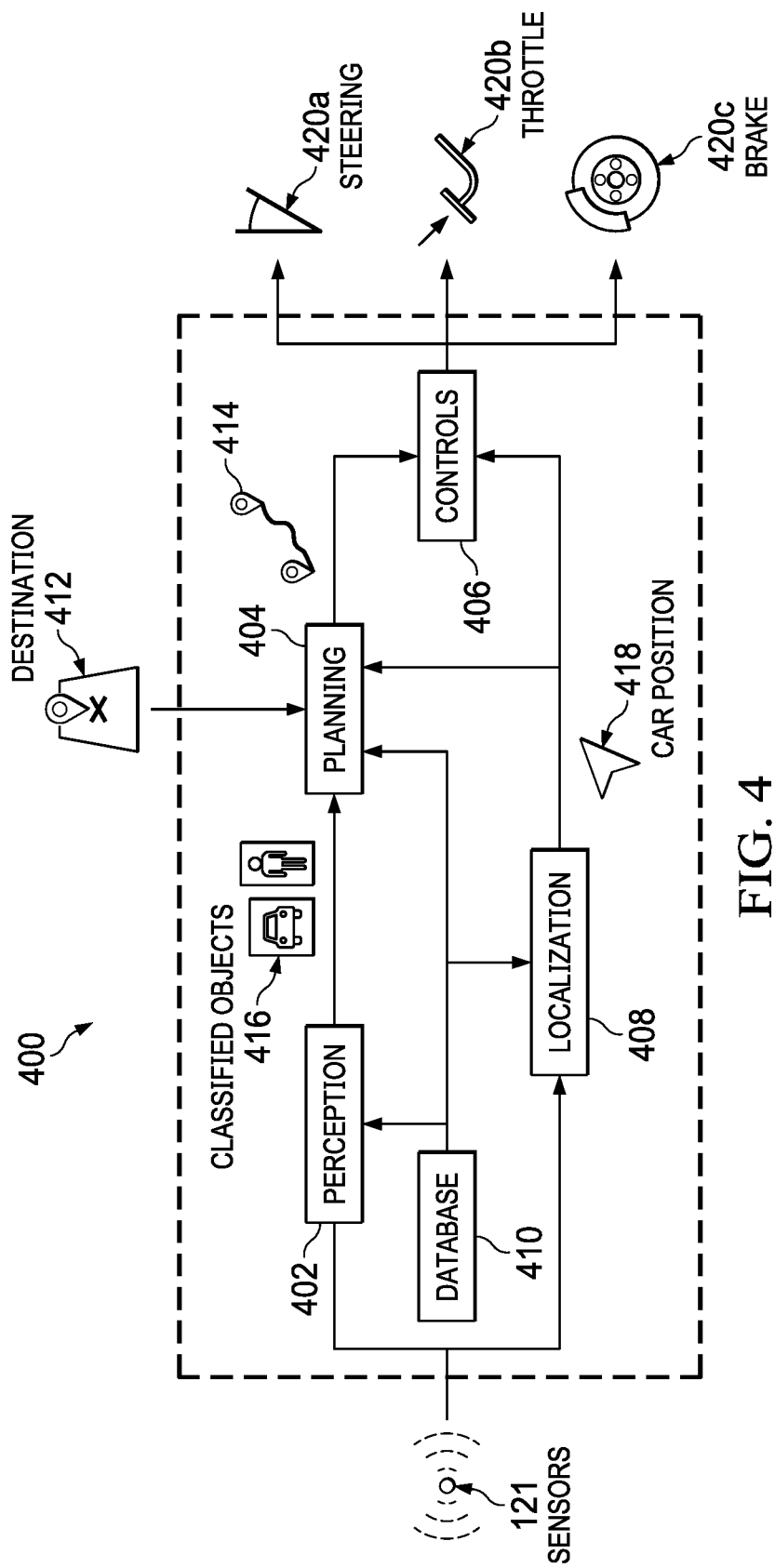
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS receiver and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Sampling Driving Scenarios

Figure 5:
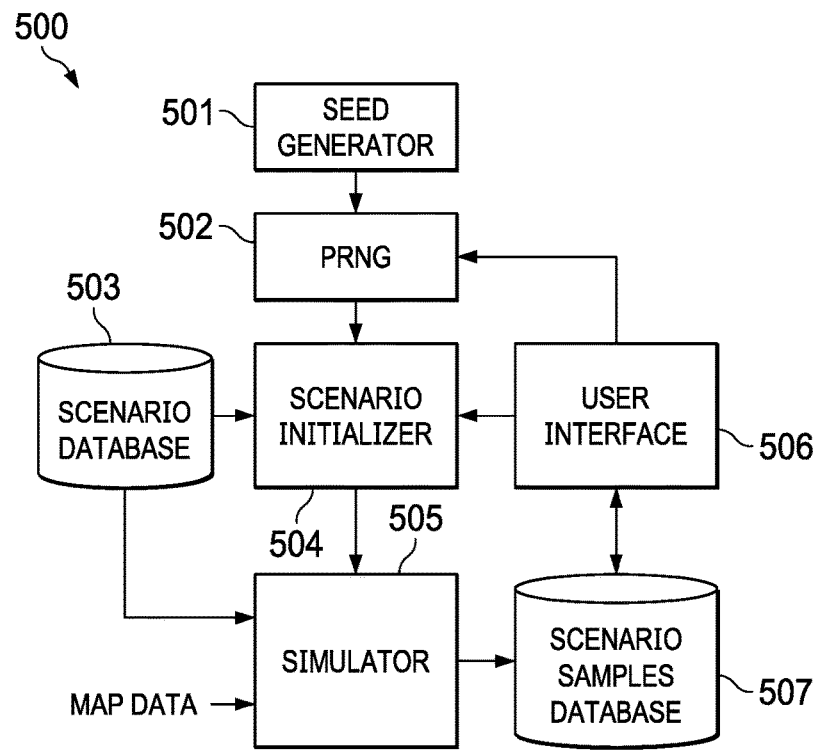
FIG. 5 shows an example system for sampling driving scenarios, in accordance with one or more embodiments.

FIG. 5 is an example system 500 for sampling driving scenarios, in accordance with one or more embodiments. System 500 includes seed generator 501, pseudorandom number generator (PRNG) 502, scenario database 503, scenario initializer 504, simulator 505, user interface (UI) 506 and scenario sample database 507.

In an embodiment, UI 506 can be a graphical user interface (GUI), text or speech interface that allows the user to select a driving scenario from a plurality of driving scenarios stored in scenario database 503. The user can also UI 506 to select one or more parameters from scenario database 503 to randomly initialize physical and mental states of one or more objects in the selected driving scenario. The user's input is received by scenario initializer 504, which initializes the physical and mental states of the one or more objects to be simulated by simulator 505. In an embodiment, UI 506 allows a user to create a scenario by specifying physical and mental states of one or more objects and road network (map), even if the exact parameters are not stored in database 503.

As used herein, an object's "physical state" includes, for example, the object's position, velocity, acceleration, direction or orientation, and object type (e.g., vehicle, pedestrian, bicyclist). The "mental state" of an object refers to the mental state of a virtual driver of a vehicle, motorcycle, bicycle or any other vehicle, or a pedestrian. Some examples of mental parameters include but are not limited to: an acceleration preference of the driver (e.g., preference to accelerate quickly from stopped position), a preference to maintain a particular distance from other objects (e.g., preference to tailgate), preference for a particular route, a goal of the driver (e.g., to get to a destination quickly), a tendency to use turn or handle signals and a politeness factor (e.g., a weighting factor) that determines how much the virtual driver is willing to inconvenience other drivers by adopting, for example an overtly aggressive or overtly passive driving style, in the driving scenario.

In an embodiment, the user can select using UI 506 a statistical distribution (e.g., a normal distribution) to be used by PRNG 502 to generate pseudorandom numbers in accordance with the selected distribution. In an embodiment, the statistical distribution can be a joint probability distribution over two or more scenario parameters. The random numbers are used to randomly generate or assign scenario parameters stored in scenario database 503. For example, a random number can be a real number in a specified range and the parameter can be the acceleration of an object (e.g., a vehicle). In this example, the random number is used to randomly select an initial acceleration from a set of initial accelerations stored in scenario database 504. In an embodiment, a true random number generator (e.g., hardware RNG) can be used that is seeded by a truly random seed provided by, for example, hardware or physical phenomena. The same or different random numbers can be used to initialize physical and mental states.

After initialization, simulator 505 simulates the motion of the objects in a map based on the initialized physical states and mental states to generate object tracks. For example, simulator 505 can implement dynamic models and equations of motion to generate the object tracks for a simulation time period specified by the user, for example, through UI 506. The user can also select a sample data rate through UI 506. For example, the user may desire to sample the object tracks at 1 Hz. The object tracks are output by simulator 505 and stored in scenario samples database 507. In an embodiment, each stored sample includes at least a time stamp and a physical state (e.g., position, velocity and acceleration) for each object in the driving scenario. If the object has a mental state that will be stored with the sample as well. The user can view and select samples from scenario samples database 507 using UI 506.

In an embodiment, simulator 505 determines if a particular driving scenario is a "failed" driving scenario. Examples of "failed" scenarios include but are not limited to: scenarios where two or more objects collide or where acceleration or deceleration values of one or more of the objects are higher or lower than one or more specified threshold values (e.g., too high of an acceleration would cause the vehicle to lose control).

In an embodiment, each driving scenario is simulated forward in time for a specified number of time units before a sample is output to scenario samples database 507, to allow the one or more objects to traverse their respective trajectories without failure. For example, depending on their randomized initial states, two or more object may collide in the first few seconds of the simulation creating a failed driving scenario. By letting the simulation run for a specified period of time (e.g., 2-3 seconds) before sampling, these failed scenarios can be avoided or reduced in number.

In an embodiment, the objects comply with rulebooks and/or traffic rules (e.g., stopping at stop signs and traffic lights, driving within the posted speed limit).

In an embodiment, simulator 505 simulates any desired driving scenario, including but not limited to sensor failure scenarios, adverse weather conditions, adverse road conditions, low or high object or traffic density, communication failure scenarios. The simulated driving scenarios can be for any desired road characteristic or condition, including but not limited to: intersection scenarios, lane changing scenarios, collision avoidance scenarios, etc. In an embodiment, the driving scenario is generated based on at least one of a specified density of objects (e.g., an urban city versus countryside), a specified day or a specified time of day (e.g., to simulate rush hour traffic or compare city and country side performance).

In an embodiment, for a given scenario the "physical states" of one or more objects are fixed and the "mental states" of virtual drivers are varied, such as, for example, varying the intended route, politeness, time headway to vehicle ahead, etc.

Figure 6:
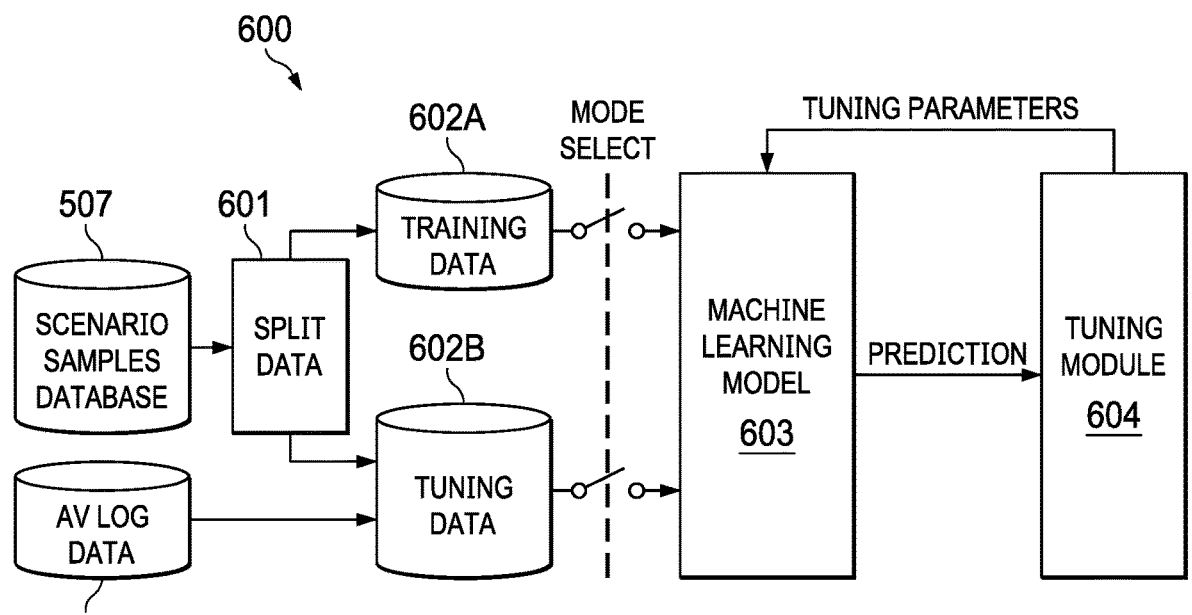
FIG. 6 shows an example system for training and/or tuning a machine learning model using sampled driving scenarios, in accordance with one or more embodiments.

FIG. 6 is an example system 600 for training and tuning a machine learning model using sampled driving scenarios generated by system 500, in accordance with one or more embodiments. System 600 includes scenario samples database 507, data splitter 601, training database 602a, tuning database 602b, machine learning model 603 (e.g., motion prediction model), tuning module 604 and AV log database 605.

In an embodiment, the scenario samples in scenario samples database 507 are split into training data 602a and tuning data 602b. In training mode, machine learning model 603 is trained with training data 602a. Machine learning model 603 can be trained and/or tuned using supervised, unsupervised or reinforcement approaches. Machine learning model 603 includes but is not limited to: artificial neural networks, decision trees, support vector machines, regression analysis, Bayesian networks and genetic algorithms. In an embodiment, the sampled driving scenario is embedded in a pseudo-image, such as a bird's eye view (BEV), which is used to train the machine learning model (e.g., train an image-based deep neural network).

In tuning mode, machine learning model 603 is tuned using tuning data 602b and or AV log data from database 605. Tuning module 604 tunes machine learning model 603 through iterative optimization of a loss function of predictions output by machine learning model 603 and ground truth data. For example, through iterative optimization of the loss function, machine learning model 603 learns an optimal function that can be used to predict the output associated with new inputs. The optimal function allows the machine learning algorithm to correctly determine the output for tuning data 602b and/or AV log data. In an embodiment, machine learning model 603 is a deep neural network and tuning module 604 iteratively optimizes a mean squared error (MSE) loss function using stochastic gradient descent or an Adam optimizer, which computes updated weights for the deep neural network. The trained machine learning model 603 is stored and used later for inference for real-world autonomous driving, such as motion prediction for one or more of localization, planning, perception or control tasks.

Example Processes

Figure 7:
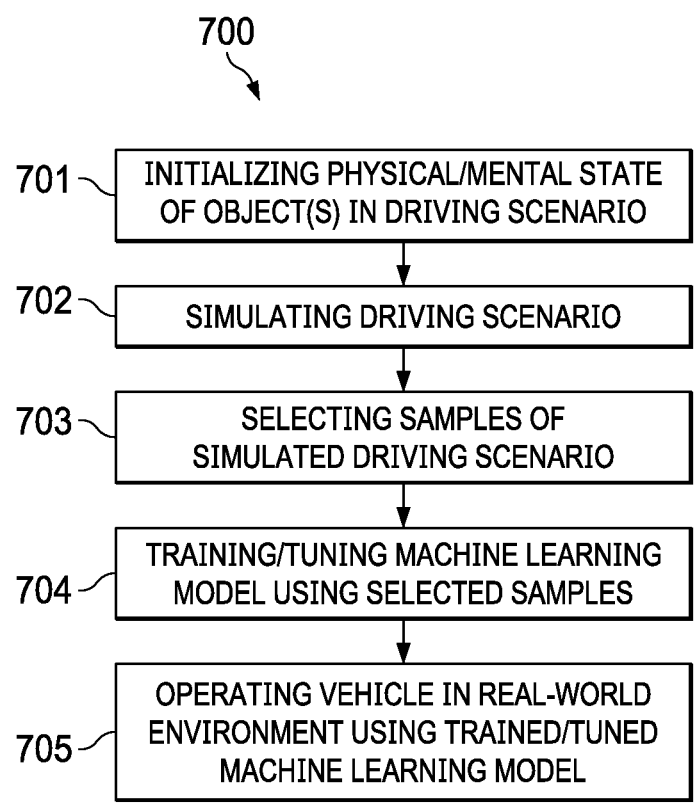
FIG. 7 is a flow diagram of an example process of sampling driving scenarios, in accordance with one or more embodiments.

FIG. 7 is a flow diagram of a process 700 of sampling driving scenarios, in accordance with one or more embodiments. Process 700 can be implemented using, for example, the computer system described in reference to FIG. 3.

Process 700 begins by assigning a set of initial physical states to a set of objects in a map for a set of simulated driving scenarios, wherein the set of initial physical states are assigned according to one or more outputs of a random number generator (701). For example, a random or pseudorandom number generator can be initialized with a seed and configured to generate random or pseudorandom numbers that can be used to generate or assign initialization parameters for the physical and mental states of the one or more objects. In an embodiment, for a given scenario the "physical states" of one or more objects are fixed and the "mental states" of virtual drivers are varied, such as, for example, varying the intended route, politeness, time headway to vehicle ahead, etc.

Process 700 continues by generating the simulated driving scenarios using the initialized physical and optional mental states of the one or more objects (702). For example, dynamic models and equations of motion can be used to move the one or more objects in a map starting from their randomly initialized physical states.

Process 700 continues by selecting samples of the simulated driving scenario (703). For example, the user can select driving scenario samples scenario samples database 507, as described in reference to FIG. 6, and also specify a data rate for the simulated data output.

Process 700 continues by training and/or tuning a machine learning model using the selected samples (704). For example, a deep neural network can be trained using the driving scenario samples selected by the user through a user interface, as described in reference to FIG. 6.

Process 700 continues by operating a vehicle in an environment using the trained and/or tuned machine learning model (705). For example, the trained deep neural network can be used by a perception module of an AV for inferring motion of one or more objects.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
assigning, using at least one processor, a set of initial physical states to a set of objects for a set of simulated driving scenarios;
generating, using the at least one processor, the set of simulated driving scenarios using the initial physical states of the objects in the set of objects;
determining, using the at least one processor, one or more failed driving scenarios in the set of simulated driving scenarios;
excluding, using the at least one processor, the one or more failed driving scenarios from the set of simulated driving scenarios, wherein the one or more failed driving scenarios comprise a driving scenario where acceleration or deceleration values of one or more objects in the set of objects are higher or lower than one or more specified threshold values;
training, using the at least one processor, a machine learning model using first samples of the set of simulated driving scenarios;
obtaining, using the at least one processor, tuning data comprising second samples of the set of simulated driving scenarios;
tuning, using the at least one processor, the trained machine learning model with the tuning data;
optimizing, using the at least one processor, a loss function of predictions output by the tuned machine learning model; and
causing, using the at least one processor, a vehicle to operate in an environment using the tuned machine learning model.

2. The method of claim 1, further comprising:
obtaining, using the at least one processor, log data from a database; and
tuning, using the at least one processor, the trained machine learning model with the log data.

3. The method of claim 1, further comprising:
selecting a seed from a normal distribution;
initializing a random number generator with the seed; and
assigning the set of initial physical states according to one or more random numbers output from the random number generator.

4. The method of claim 1, wherein the loss function is a mean squared error (MSE) loss function.

5. The method of claim 4, further comprising:
optimizing, using the at least one processor, the loss function using stochastic gradient descent or an Adam optimizer.

6. The method of claim 1, further comprising:
embedding, using the at least one processor, each sample of the set of simulated driving scenarios into a pseudo-image; and
training, using the at least one processor, the machine learning model using the pseudo-image.

7. The method of claim 1, further comprising:
assigning, using the at least one processor, a mental state of a virtual driver of a virtual vehicle; and
simulating driving scenarios using a map, an initial physical state of each object in the map, and the mental state of the virtual driver of the virtual vehicle.

8. The method of claim 7, wherein the mental state of the virtual driver comprises an acceleration preference of the virtual driver.

9. The method of claim 7, wherein the mental state of the virtual driver comprises a preference to maintain a gap between the other virtual vehicle and at least one other object in the set of objects.

10. The method of claim 7, wherein the mental state of the virtual driver comprises a preference for a particular route.

11. The method of claim 7, wherein the mental state of the virtual driver comprises a goal of the virtual driver.

12. The method of claim 7, wherein the mental state of the virtual driver comprises a politeness factor that determines how much the virtual driver is willing to inconvenience other virtual drivers of other virtual vehicles in the simulated driving scenarios.

13. The method of claim 1, wherein the machine learning model is a deep neural network for object motion prediction.

14. The method of claim 1, wherein each sample of the set of simulated driving scenarios comprises a plurality of time stamps and associated position, velocity or acceleration of a virtual vehicle.

15. The method of claim 1, wherein generating the set of simulated driving scenarios further comprises:
  simulating a motion of the set of objects based on the set of initial physical states to generate object tracks for a simulation time period; and
  sampling the object tracks at a particular sample data rate to obtain samples of the set of simulated driving scenarios, wherein each sample comprises a time stand and a physical state for each object in the set of simulated driving scenarios.

16. The method of claim 15, wherein generating the set of simulated driving scenarios further comprises:
  predicting each simulated driving scenario forward in time for a specified period of time before sampling the object tracks.

17. The method of claim 1, wherein the one or more failed driving scenarios comprise a driving scenario where a collision occurs between two or more objects in the set of objects.

18. A system, comprising:
  at least one processor; and
  a memory storing instructions thereon that, when executed by the at least one processor, cause the at least one processor to:
    assign a set of initial physical states to a set of objects for a set of simulated driving scenarios;
    generate the set of simulated driving scenarios using the initial physical states of the objects in the set of objects;
    determine one or more failed driving scenarios in the set of simulated driving scenarios;
    exclude the one or more failed driving scenarios from the set of simulated driving scenarios, wherein the one or more failed driving scenarios comprise a driving scenario where acceleration or deceleration values of one or more objects in the set of objects are higher or lower than one or more specified threshold values;
    train a machine learning model using first samples of the set of simulated driving scenarios;
    obtain tuning data comprising second samples of the set of simulated driving scenarios;
    tune the trained machine learning model with the tuning data;
    optimize a loss function of predictions output by the tuned machine learning model; and
    cause a vehicle to operate in an environment using the tuned machine learning model.

19. The method of claim 18, wherein the at least one processor is further caused to:
  obtain log data from a database; and
  tune the trained machine learning model with the log data.

* * * * *

UNITED STATES PATENT AND TRADEMARK OFFICE
CERTIFICATE OF CORRECTION

PATENT NO. : 11,938,957 B2
APPLICATION NO. : 17/001616
DATED : March 26, 2024
INVENTOR(S) : Eric Wolff Page 1 of 1

It is certified that error appears in the above-identified patent and that said Letters Patent is hereby corrected as shown below:

On the Title Page

Column 2 (other publications), Line 1, delete "http:/web." and insert -- http://web. --;

In the Claims

Column 15, Line 56, In Claim 1, delete "method" and insert -- method, --;

Column 17, Line 12, In Claim 15, delete "stand" and insert -- stamp --;

Column 18, Line 24, In Claim 19, delete "method" and insert -- system --.

Signed and Sealed this
Fourteenth Day of May, 2024

Katherine Kelly Vidal
*Director of the United States Patent and Trademark Office*